(12) United States Patent
Feng et al.

(10) Patent No.: US 11,787,004 B2
(45) Date of Patent: Oct. 17, 2023

(54) STEEL BACKING PLATE WIREDRAWING EQUIPMENT AND METHOD

(71) Applicant: Yantai Xingchuang Automobile Parts Co., Ltd., Yantai (CN)

(72) Inventors: Xingping Feng, Yantai (CN); Kaixu Yuan, Yantai (CN); Po Du, Yantai (CN)

(73) Assignee: YANTAI XINGCHUANG AUTOMOBILE PARTS CO., LTD., Yantai (CN)

( * ) Notice: Subject to any disclaimer, the term of this patent is extended or adjusted under 35 U.S.C. 154(b) by 0 days.

(21) Appl. No.: 18/096,729

(22) Filed: Jan. 13, 2023

(65) Prior Publication Data

US 2023/0294229 A1 Sep. 21, 2023

(30) Foreign Application Priority Data

Mar. 21, 2022 (CN) .......................... 202210274241.X

(51) Int. Cl.
| | |
|---|---|
| *B23Q 15/12* | (2006.01) |
| *B25B 11/00* | (2006.01) |
| *B23C 3/30* | (2006.01) |
| *B23K 11/11* | (2006.01) |

(52) U.S. Cl.
CPC ................ *B23Q 15/12* (2013.01); *B23C 3/30* (2013.01); *B23K 11/11* (2013.01); *B25B 11/005* (2013.01); *F16D 2250/003* (2013.01)

(58) Field of Classification Search
CPC . F16D 2250/003; B25B 11/005; B23K 11/11; B23C 3/30; B23Q 15/12
See application file for complete search history.

*Primary Examiner* — Moshe Wilensky
(74) *Attorney, Agent, or Firm* — WPAT, P.C

(57) ABSTRACT

The present disclosure provides steel backing plate wiredrawing equipment and method. The equipment includes a support frame; a first longitudinal rail and a second longitudinal rail which are respectively arranged on two sides of the support frame and are parallel to each other; a longitudinal movement frame slidably arranged on the first longitudinal rail and the second longitudinal rail; and a transverse movement frame slidably arranged on the longitudinal movement frame. A numerical control cutting machine, a vacuum cylinder, a glue dispenser, and a spot welder are integrated on the transverse movement frame; the longitudinal movement frame is provided with a power mechanism I, and the transverse movement frame is provided with a power mechanism II; the support frame is provided with a support plate; and the support plate is provided with a first laminate and a second laminate which are made of steel in sequence from bottom to top.

1 Claim, 4 Drawing Sheets

STEEL BACKING PLATE WIREDRAWING EQUIPMENT AND METHOD

TECHNICAL FIELD

The present disclosure belongs to the technical field of steel backing plate machining, and specifically relates to steel backing plate wiredrawing equipment and method.

BACKGROUND ART

At present, in order to firmly attach a friction material to a steel backing plate of a brake pad, protrusions or pits with a certain density are often machined on the steel backing plate of the brake pad, that is, a wiredrawing mechanism is provided on a contact surface of the steel backing plate. However, the existing steel backing plate wiredrawing process has the following technical problems:
  (1) According to the existing steel backing plate wiredrawing process, a single cutterhead is used to stab a surface of the steel backing plate to form a drawn wire. At each time when the cutterhead stabs the surface, one drawn wire is formed. The wiredrawing process for one steel backing plate will be completed after the cutterhead stabs the surface for multiple times, resulting in low production efficiency of the process.
  (2) When a workpiece is machined at a wiredrawing starting station, it is fixed by a cylinder. In this way, the fixation is poor; the workpiece is easy to damage; and the cost is high, resulting in non-uniform wiredrawing of the steel backing plate.
  (3) Although an existing machining device can make thorn-like protrusions on the steel backing plate of the brake pad, during feeding of the steel backing plate, the steel backing plate can only be manually placed alone on a workbench one by one, which not only increases the labor intensity of working staff, but also causes low working efficiency, so that automatic production cannot be achieved.

Therefore, this solution solves the above-mentioned technical problems.

SUMMARY

The present disclosure aims to provide steel backing plate wiredrawing equipment and method, which solves the technical problem of how to efficiently perform wiredrawing on a steel backing plate. A new wiredrawing process is proposed, which greatly improves the working efficiency and achieves uniform wiredrawing, thus achieving the technical effect of semi-automation and even full-automation.

Steel backing plate wiredrawing equipment includes a support frame; a first longitudinal rail and a second longitudinal rail which are respectively arranged on two sides of the support frame and are parallel to each other; a longitudinal movement frame slidably arranged on the first longitudinal rail and the second longitudinal rail; and a transverse movement frame slidably arranged on the longitudinal movement frame. A numerical control cutting machine, a vacuum cylinder, a glue dispenser, and a spot welder are integrated on the transverse movement frame.

The longitudinal movement frame is provided with a power mechanism I, and the transverse movement frame is provided with a power mechanism II.

The support frame is provided with a support plate; and the support plate is provided with a first laminate and a second laminate which are made of steel in sequence from bottom to top.

The numerical control cutting machine and the spot welder may be respectively arranged on two sides of the longitudinal movement frame; the vacuum cylinder and the glue dispenser may be respectively arranged on two sides of the longitudinal movement frame; a vacuum chuck may be arranged at a bottom end of the vacuum cylinder; and a strong structural adhesive may be arranged in the glue dispenser.

An electromagnetic hoisting subassembly may be further arranged on the transverse movement frame; the electromagnetic hoisting subassembly may include an electromagnetic chuck I and an electromagnetic chuck II; and the electromagnetic chuck I and the electromagnetic chuck II may be respectively arranged on two sides of the transverse movement frame.

A pressure roller may be arranged on the longitudinal movement frame; the pressure roller may be perpendicular to a trough plate; two ends of the pressure roller may be respectively hinged to a telescopic rod of a lifting cylinder; and the pressure roller may be arranged below the transverse movement frame.

The power mechanism I may include a fixed block arranged on an outer side of the longitudinal movement frame, a rotating shaft I may vertically pass through the fixed block, a gear I may be arranged at a bottom end of the rotating shaft I, and a motor I may be connected to a top end of the rotating shaft I; the motor I may be arranged on the fixed block; and the gear I may be connected to a meshing tooth arranged on the first longitudinal rail or the second longitudinal rail.

The power mechanism II may include a rotating shaft II vertically passing through a top end of the transverse movement frame, a gear II may be arranged at a bottom end of the rotating shaft II, and a motor II may be arranged at a top end of the rotating shaft II; and the gear II may be connected to a meshing tooth arranged on the longitudinal movement frame.

The longitudinal movement frame may include a U-shaped rod with a downward opening, transverse rods respectively perpendicularly arranged at two ends of the U-shaped rod, and moving wheels may be respectively arranged at two ends of the transverse rods; and the moving wheels may be arranged in the first longitudinal rail or the second longitudinal rail.

A steel backing plate wiredrawing method includes the following specific steps:
  step S1: superposing and stacking two layers of steel plates on a support plate, and aligning edges;
  step S2: using a numerical control cutting machine to simultaneously cut, according to a numerical control programming language, the two layers of steel plates to obtain a steel backing plate member; and by decreasing the power of the cutting machine and a cutting depth, further cutting the top-layer steel plate only to obtain a reinforcing rib subassembly on the steel backing plate member;
  step S3: using a vacuum chuck at a bottom end of a vacuum cylinder to pull in the reinforcing rib subassembly; using a glue dispenser to perform a glue dispensing operation to dispense a structural adhesive on an upper end surface of the bottom-layer steel plate; then placing the reinforcing rib subassembly on the structural adhesive;
  step S4: after the glue dispensing operation is terminated, since the whole glue dispensing operation does not spend much time, and the structural adhesive on the bottom-layer steel plate is not completely cured yet, at the time, using a pressure roller to roll the top-layer steel plate so that the bottom-layer steel plate is combined with the reinforcing rib subassembly on the top layer more closely;

step S5: after the cutting of the reinforcing rib subassembly is completed, since a remaining part of the top-layer steel plate becomes a waste, using a hoisting device to remove the waste;

step S6: using a spot welder to perform a spot welding operation on the bottom-layer steel plate and the reinforcing rib subassembly on the top layer: performing spot welding on inner edges of connection surfaces of the bottom-layer steel plate and the reinforcing rib subassembly; and step S7: finally, taking out the prepared steel backing plate structure.

Two metal plates can achieve welding strength by means of connection by the structural adhesive.

Compared with the existing art, the present disclosure has the following beneficial effects.

(1) In this solution, the brand-new steel backing plate wiredrawing preparation process is used to overcome the shortcomings of a conventional process using a cutter for wiredrawing, thus avoiding huge noise when the cutter contacts the steel plates. Hierarchical treatment for the steel backing plate lowers the machining difficulty. The glue dispensing and spot welding treatment processes are adopted to ensure the connection strength of the steel backing plate.

(2) By the adoption of the spot welding treatment process, on the one hand, the connection strength can be enhanced; and on the other hand, a temperature rise is helpful to cure the structural adhesive, which accelerates the curing process. As everyone knows, if the temperature of the structural adhesive is low, the structural adhesive should be heated, which can promote the curing.

(3) Since the second laminate is disposed, after the numerical control cutting, the second laminate is cut into the reinforcing rib subassembly and the waste part. After the reinforcing rib subassembly is taken out, and is subjected to the glue dispensing treatment, the waste part further has a limiting effect, so that the reinforcing rib subassembly can be accurately connected to the first laminate.

(4) The rolling treatment process is adopted. That is, after the glue dispensing is completed, the pressure roller is rolled on the second laminate back and forth, which is helpful to combine the reinforcing rib subassembly with the first laminate more tightly and also avoids the influence, caused when the waste part is taken out, on the position of the reinforcing rib subassembly.

Figure 1:
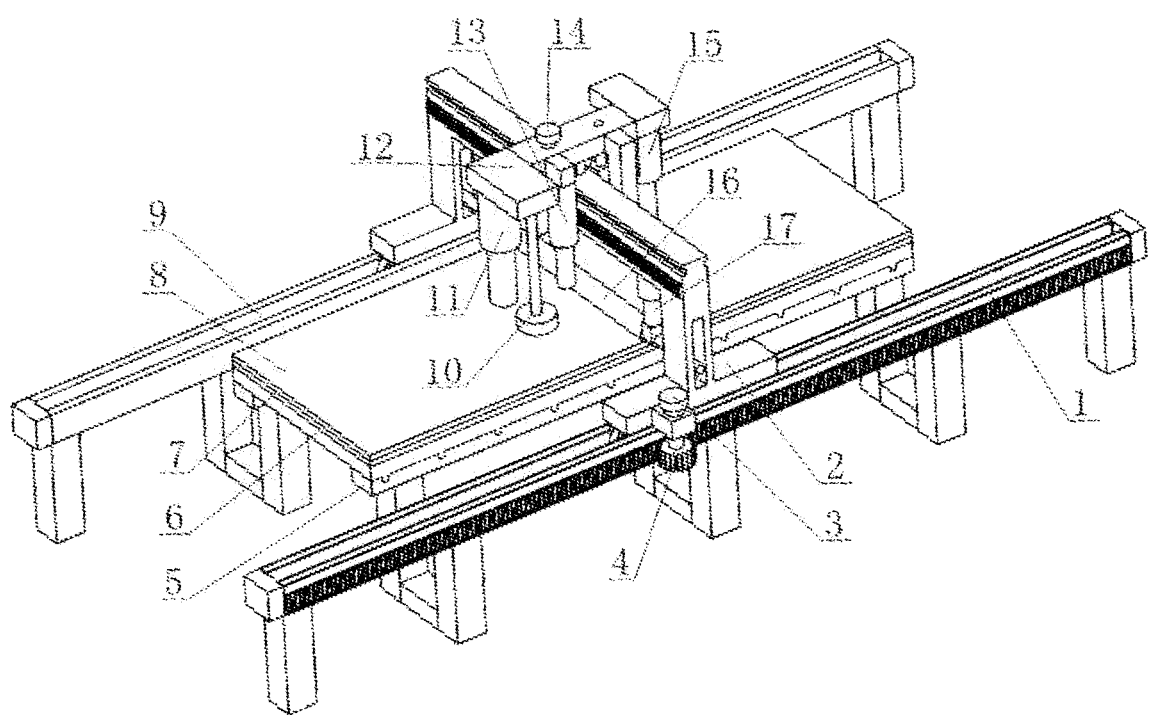
FIG. 1 is a schematic structural diagram I of steel backing plate wiredrawing equipment in an embodiment of the present disclosure.
Figure 2:
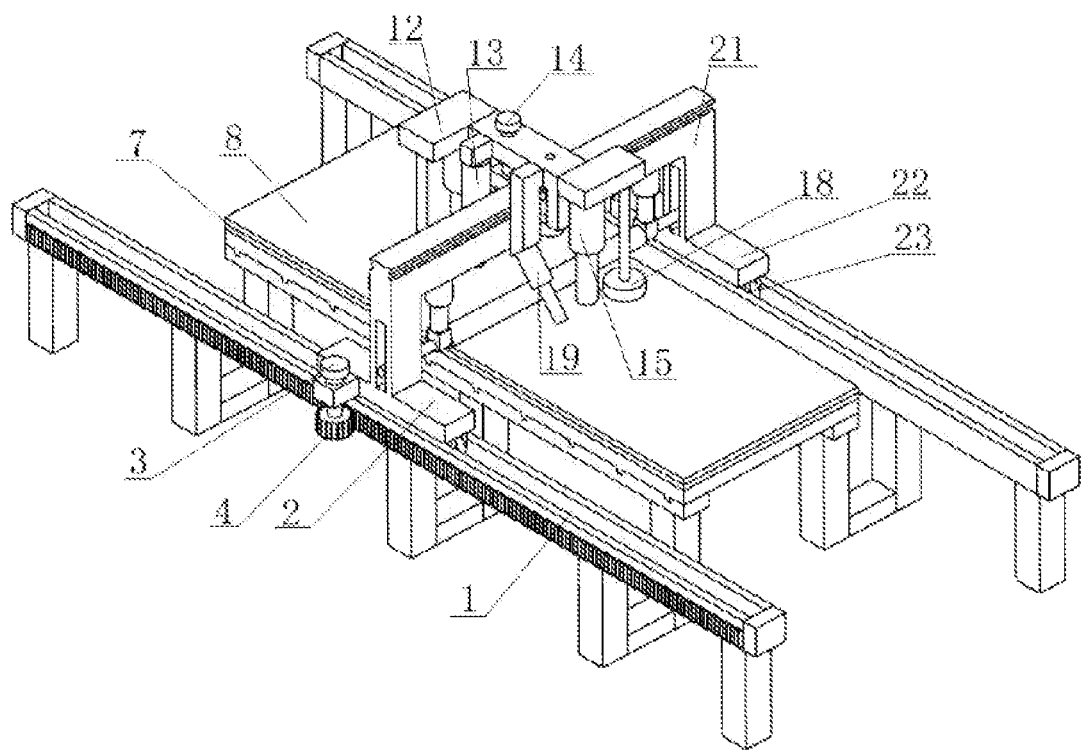
FIG. 2 is a schematic structural diagram II of steel backing plate wiredrawing equipment in an embodiment of the present disclosure.
Figure 3:
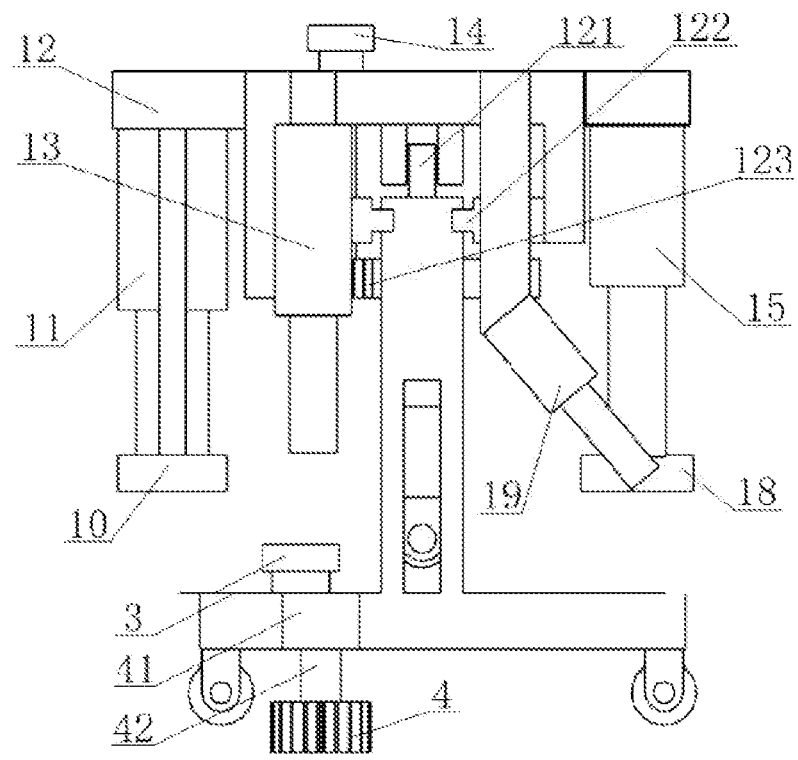
FIG. 3 is a right view of steel backing plate wiredrawing equipment in an embodiment of the present disclosure.
Figure 4:
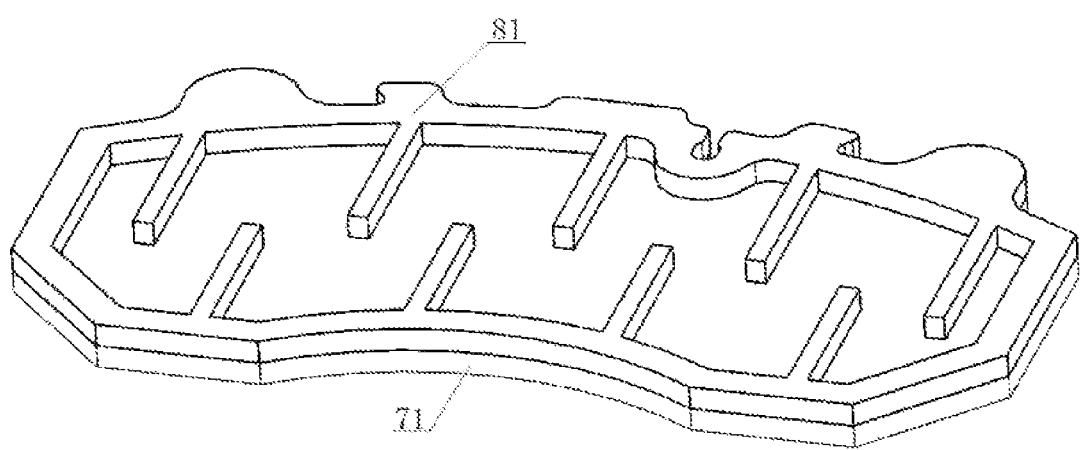
FIG. 4 is a structural schematic diagram of a steel backing plate in an embodiment of the present disclosure.
Figure 5:
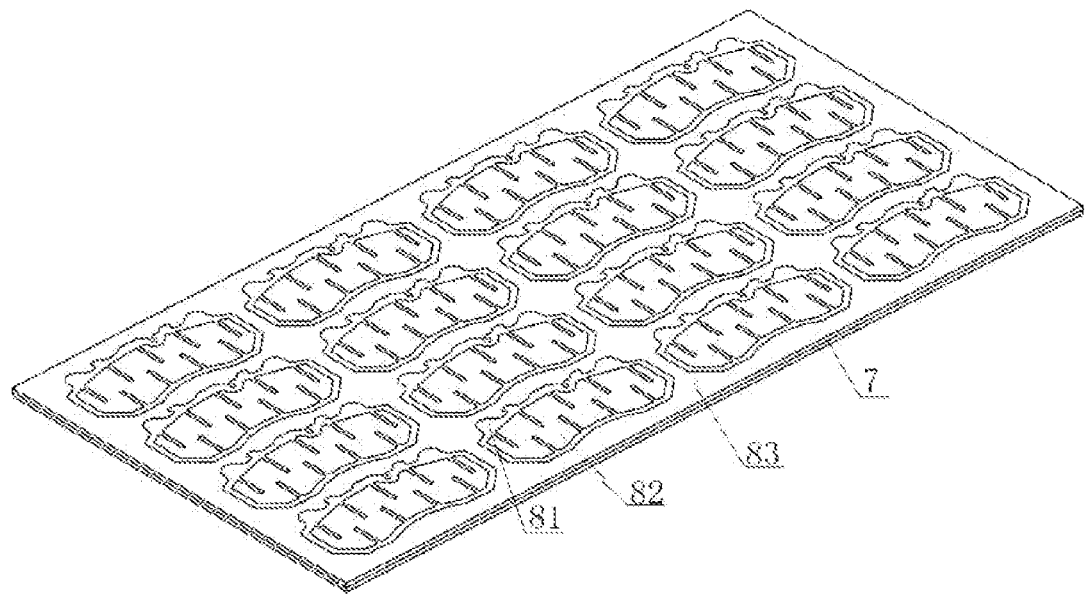
FIG. 5 is a schematic diagram of distribution of a steel backing plate on a steel plate in an embodiment of the present disclosure.
Figure 6:
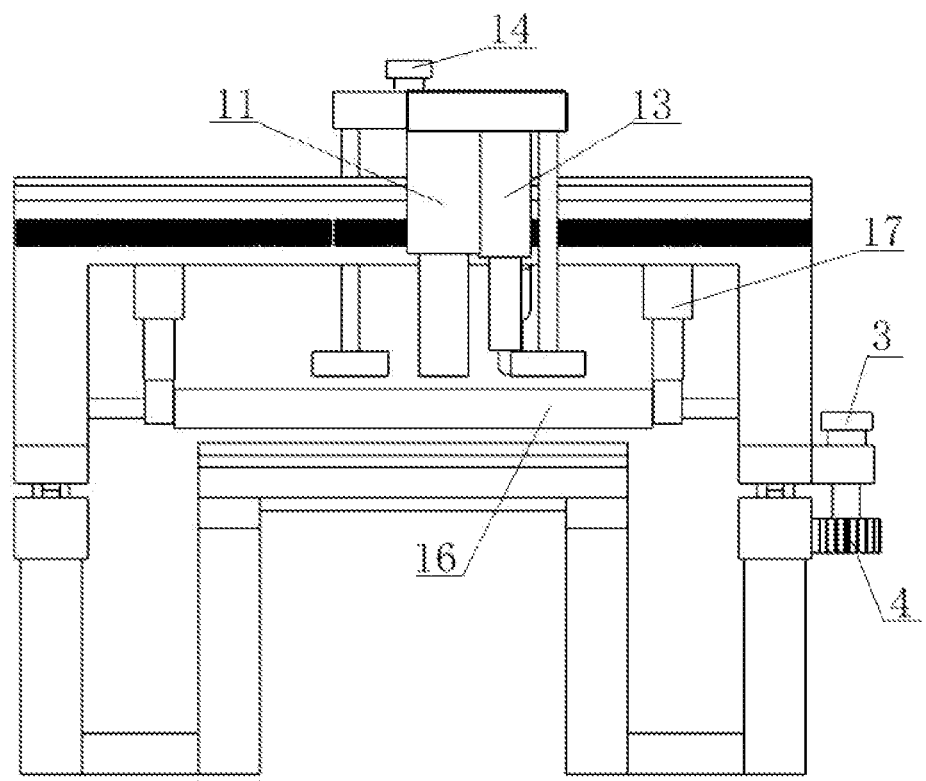
FIG. 6 is a front view of steel backing plate wiredrawing equipment in an embodiment of the present disclosure.

In the drawings: 1: first longitudinal rail; 2: longitudinal movement frame; 21: U-shaped rod; 22: transverse rod; 23: moving wheel; 3: motor I; 4: gear I; 41: fixed block; 42: rotating shaft I; 5: support frame; 6: support plate; 7: first laminate; 71: bottom-layer steel plate; 8: second laminate; 81: reinforcing rib subassembly; 82: waste I; 83: waste II; 9: second longitudinal rail; 10: electromagnetic chuck I; 11: numerical control cutting machine; 12: transverse movement frame; 121: top wheel; 122: limiting block; 123: gear II; 13: vacuum cylinder; 14: motor II; 15: spot welder; 16: pressure roller; 17: lifting cylinder; 18: electromagnetic chuck II; and 19: glue dispenser.

DETAILED DESCRIPTION OF THE EMBODIMENTS

In order to more clearly illustrate the technical features of this solution, this solution will be described below through specific implementations.

Steel backing plate wiredrawing equipment includes a support frame 5; a first longitudinal rail 1 and a second longitudinal rail 9 which are respectively arranged on two sides of the support frame 5 and are parallel to each other; a longitudinal movement frame 2 slidably arranged on the first longitudinal rail 1 and the second longitudinal rail 9; and a transverse movement frame 12 slidably arranged on the longitudinal movement frame 2, wherein a numerical control cutting machine 11, a vacuum cylinder 13, a glue dispenser 19, and a spot welder 15 are integrated on the transverse movement frame 12.

The longitudinal movement frame 2 is provided with a power mechanism I, and the transverse movement frame 12 is provided with a power mechanism II.

The support frame 5 is provided with a support plate 6; and the support plate 6 is provided with a first laminate 7 and a second laminate 8 which are made of steel in sequence from bottom to top.

More preferably, a top wheel 121 is arranged on the transverse movement frame 12. The top wheel 121 is in contact with the longitudinal movement frame 2. The transverse movement frame 12 is provided with a limiting block 122. The limiting block 122 is slidably arranged on a side part of the longitudinal movement frame 2.

The numerical control cutting machine 11 and the spot welder 15 are respectively arranged on two sides of the longitudinal movement frame 2; the vacuum cylinder 13 and the glue dispenser 19 are respectively arranged on two sides of the longitudinal movement frame 2; a vacuum chuck is arranged at a bottom end of the vacuum cylinder 13; and a strong structural adhesive is arranged in the glue dispenser 19.

An electromagnetic hoisting subassembly is further arranged on the transverse movement frame 12; the electromagnetic hoisting subassembly includes an electromagnetic chuck I 10 and an electromagnetic chuck II 18; and the electromagnetic chuck I 10 and the electromagnetic chuck II 18 are respectively arranged on two sides of the transverse movement frame 12.

A pressure roller 16 is arranged on the longitudinal movement frame 2; the pressure roller 16 is perpendicular to a trough plate; two ends of the pressure roller 16 are respectively hinged to a telescopic rod of a lifting cylinder 17; and the pressure roller 16 is arranged below the transverse movement frame 12.

The power mechanism I includes a fixed block 41 arranged on an outer side of the longitudinal movement frame 2, a rotating shaft I 42 vertically passing through the fixed block 41, a gear I 4 arranged at a bottom end of the rotating shaft I 42, and a motor I 3 connected to a top end of the rotating shaft I 42; the motor I 3 is arranged on the fixed block 41; and the gear I 4 is connected to a meshing tooth arranged on the first longitudinal rail 1 or the second longitudinal rail 9.

The power mechanism II includes a rotating shaft II vertically passing through a top end of the transverse movement frame 12, a gear II 123 arranged at a bottom end of the rotating shaft II, and a motor II 14 arranged at a top end of the rotating shaft II; and the gear II 123 is connected to a meshing tooth arranged on the longitudinal movement frame 2.

The longitudinal movement frame 2 includes a U-shaped rod 21 with a downward opening, transverse rods 22 respectively perpendicularly arranged at two ends of the U-shaped rod 21, and moving wheels 23 respectively arranged at two ends of the transverse rods 22; and the moving wheels 23 are arranged in the first longitudinal rail 1 or the second longitudinal rail 9.

A steel backing plate wiredrawing method includes the following specific steps:
- step S1: two layers of steel plates are superpose and stacked on a support plate 6, and edges are aligned;
- step S2: a numerical control cutting machine 11 is used to simultaneously cut, according to a numerical control programming language, the two layers of steel plates to obtain a steel backing plate member; and by decreasing the power of the cutting machine and a cutting depth, only the top-layer steel plate is further cut to obtain a reinforcing rib subassembly 81 on the steel backing plate;
- step S3: a vacuum chuck at a bottom end of a vacuum cylinder 13 is used to pull in the reinforcing rib subassembly 81; a glue dispenser 19 is used to perform a glue dispensing operation to dispense a structural adhesive on an upper end surface of the bottom-layer steel plate 71; the reinforcing rib subassembly 81 is then placed on the structural adhesive;
- step S4: after the glue dispensing operation is terminated, since the whole glue dispensing operation does not spend much time, and the structural adhesive on the bottom-layer steel plate 71 is not completely cured yet, at the time, a pressure roller 16 is used to roll the top-layer steel plate so that the bottom-layer steel plate 71 is combined with the reinforcing rib subassembly 81 on the top layer more closely;
- step S5: after the cutting of the reinforcing rib subassembly 81 is completed, since a remaining part of the top-layer steel plate becomes a waste, a hoisting device is used to remove the waste,
    where the waste includes a waste I 82 and a waste II 83; the waste I 82 is a filler; the waste II 83 is an edge part;
- step S6: a spot welder 15 is used to perform a spot welding operation on the bottom-layer steel plate 71 and the reinforcing rib subassembly 81 on the top layer: spot welding is performed on inner edges of connection surfaces of the bottom-layer steel plate and the reinforcing rib subassembly; and
- step S7: finally, the prepared steel backing plate structure is taken out.

Two metal plates can achieve welding strength by means of connection by the structural adhesive.

In this solution, the upper and lower steel layers are further in fastened connection by means of spot welding.

Numerical control cutting is a cutting machine based on numerical control flame, plasma, laser, water jet, and the like. Full-time, automatic, high-efficiency, high-quality, and high-utilization numerical control cutting is performed according to an optimized nesting cutting program provided by numerical control cutting nesting software. The numerical control cutting represents a modern high-tech production method. It is a product of the combination of an advanced optimized nesting calculation technology and a computer numerical control technology as well as cutting machinery. In this solution, any one of the cutting machines based on numerical control flame, plasma, laser, water jet, and the like can be adopted.

A specific working process of the present disclosure is as follows:

A plurality of sets of working equipment are integrated on the transverse movement frame 12, so that the working efficiency can be greatly improved. In this solution, a programmable logic control (PLC) system is provided. Under the action of the control system, the numerical control cutting machine 11, the vacuum cylinder 13, the glue dispenser 19, the spot welder 15, the hoisting equipment, and the power mechanisms work harmonically.

The first laminate 7 and the second laminate 8 are stacked on the support plate 6 in sequence. At this time, the power of the numerical control cutting machine 11 is increased, so that the two laminates are simultaneously cut according to the contour of the steel backing plate. The power of the numerical control cutting machine 11 is then decreased, so that only the second laminate 8 is cut, and the reinforcing rib subassembly 81 is obtained.

The vacuum chuck is used to pull in the reinforcing rib subassembly 81. The adhesive is dispensed in a slot formed in the second laminate 8. The structural adhesive is in contact with the bottom-layer steel plate 71. The reinforcing rib subassembly 81 is placed in the slot, so that the reinforcing rib subassembly 81 is connected to the structural adhesive.

The pressure roller 16 is used to roll the second laminate 8 to enhance the combination degree. The waste part of the second laminate 8 is hoisted and removed. A connection gap between the bottom-layer steel plate 71 and the reinforcing rib subassembly 81 is subjected to spot welding to enhance the connection strength. Finally, the prepared steel backing plate structure is taken out.

The undescribed technical features of the present disclosure can be achieved by or using the existing technology and will not be repeated here. Of course, the above description is not a limitation to the present disclosure. The present disclosure is not limited to the above examples. Changes, modifications, additions, or substitutions made by those of ordinary skill in the art within the essential scope of the present disclosure shall also belong to the protection scope of the present disclosure, as defined by the following claims.

The invention claimed is:

1. A steel backing plate wiredrawing method, comprising the following specific steps:
   - step S1: superposing and stacking two layers of steel plates on a support plate (6), and aligning edges;
   - step S2: using a numerical control cutting machine (11) to simultaneously cut, according to a numerical control programming language, the two layers of steel plates to obtain a steel backing plate member; and by decreasing the power of the cutting machine and a cutting depth, further cutting the top-layer steel plate only to obtain a reinforcing rib subassembly (81) on the steel backing plate;
   - step S3: using a vacuum chuck at a bottom end of a vacuum cylinder (13) to pull in the reinforcing rib subassembly (81); using a glue dispenser (19) to perform a glue dispensing operation to dispense a structural adhesive on an upper end surface of the bottom-layer steel plate (71); then placing the reinforcing rib subassembly (81) on the structural adhesive;

step S4: after the glue dispensing operation is terminated, since the whole glue dispensing operation does not spend much time, and the structural adhesive on the bottom-layer steel plate (71) is not completely cured yet, at the time, using a pressure roller (16) to roll the top-layer steel plate so that the bottom-layer steel plate (71) is combined with the reinforcing rib subassembly (81) on the top layer more closely;

step S5: after the cutting of the reinforcing rib subassembly (81) is completed, since a remaining part of the top-layer steel plate becomes a waste, using a hoisting device to remove the waste;

step S6: using a spot welder (15) to perform a spot welding operation on the bottom-layer steel plate (71) and the reinforcing rib subassembly (81) on the top layer: performing spot welding on inner edges of connection surfaces of the bottom-layer steel plate and the reinforcing rib subassembly; and step S7: finally, taking out the prepared steel backing plate structure.

\* \* \* \* \*